United States Patent [19]

Lindroos

[11] 4,098,780
[45] Jul. 4, 1978

[54] METHOD OF TREATING LIQUIDS CONTAINING BLOOD SUBSTANCES

[75] Inventor: Paul Göran Sigvard Lindroos, Eriksgatan 37, 20100 Åbo 10 Finland

[21] Appl. No.: 748,284

[22] Filed: Dec. 7, 1976

Related U.S. Application Data

[63] Continuation-in-part of Ser. No. 583,654, Jun. 4, 1975, abandoned.

[30] Foreign Application Priority Data

Dec. 11, 1975 [SE] Sweden ................. 7513987

[51] Int. Cl.$^2$ ........................................... C07C 103/52
[52] U.S. Cl. ...................... 260/112.5 R; 260/112 B; 426/647; 23/230 B; 260/314
[58] Field of Search .................. 260/112.5 R, 112 B, 260/314; 426/647; 23/230 B

[56] References Cited

U.S. PATENT DOCUMENTS

| 2,710,293 | 6/1955 | Gerlough | 260/112 B |
| 2,710,294 | 6/1955 | Gerlough | 260/112 B |

OTHER PUBLICATIONS

J. Biol. Chem., vol. 163, pp. 713-714, (1946).
Liu, et al.; Chinese J. of Physiology, 1934, 8, No. 2, pp. 97-110.
E. J. Cohn, et al.; "Separation of Protein Components of Human Plasma", 1950, pp. 465-474.

Primary Examiner—Delbert R. Phillips
Attorney, Agent, or Firm—Lerner, David, Littenberg & Samuel

[57] ABSTRACT

A method of separating iron compounds from protein, mainly globin, which compounds are derived from hemoglobine, in a liquid containing blood substances, by adding to the liquid such a quantity of ethanol that the total ethanol concentration in the liquid amounts to at least 40 per cent by volume, preferably to at least 70 per cent by volume and by adjusting the pH of the liquid to a value lower than 4.5, preferably to a value of 2.5 to 4.5, and by possibly adding inorganic sodium or potassium salts in order to accentuate the agglomeration of iron compounds separated, whereafter the agglomerates of iron compounds are isolated and the globin remaining in the solution is recovered from the solution.

17 Claims, No Drawings

METHOD OF TREATING LIQUIDS CONTAINING BLOOD SUBSTANCES

This application is a continuation-in-part application of Ser. No. 583,654 filed June 4, 1975 and now abandoned.

The present invention is concerned with a method of separating the iron compounds from the protein in a liquid that contains blood substances, mainly globin and iron compounds derived from hemoglobin.

The liquid is obtained from slaughtering blood, which is, by means of a simple centrifuge operation, separated into its two liquid phases, plasma and broth of red blood cells, the latter one also called waste blood. The waste blood contains about 70 percent of the total protein content of blood. The main part of this protein is in the form of hemoglobin, which consists of a protein component, globin, and of an iron compound, ferroprotoporphyrin. This iron compound gives the blood its particular taste and colour, red in the liquid form and black in the powder form.

A solution of globin is colourless to slightly yellow, globin in the powder form is white to light yellow.

When ferroprotoporphyrin is cleaved from hemoglobin, the iron is often converted into the ferri form, the chloride of this iron compound is called hemin and characterized by an intensive black colour.

Blood protein, mainly globin, that has been made free from this iron compound and thereby from the taste and colour resulting from same, is used in the food industry because of its nutrient value and, if the functional properties have been retained, as a texturing agent as well.

The iron compound, which is constructed of four pyrrole rings around the iron atom and keeps the iron in a so-called heme-bound form, is used as an iron-enriching agent in the foodstuffs and pharmaceutical industry.

The broth of red blood cells is treated in a way previously known so that the cell membrane of the red blood cells is exploded and a solution of hemoglobin is obtained. The fragments of cell membrane are possibly separated by centrifuging.

A method is previously known by which, on the laboratory scale, the iron component and the globin are separated chromatographically or by means of extraction, in which connection solvents have been used such as methylethylketone, acetone, and dimethylformamide.

The chromatographic method is less suitable on the technical scale, and the extraction by means of solvents is unsuitable in view of the use of the obtained product as fodder or food.

In accordance with the method of the present invention, the liquid containing blood substance is treated by adding to the liquid as such a quantity of ethanol that the total ethanol content in the liquid amounts to at least 40 percent by volume, as calculated from the total quantity of liquid, and by adjusting the pH of the liquid to a value lower than 4.5, and by separating the agglomerations of iron compounds that are formed in this connection from the solution. The globin remaining in the solution can then be recovered in a suitable way.

Accordingly to the present invention, the use of a simple process technique is permitted and thereby a technically and economically practicable method is obtained for separating iron compounds from the globin, and the use of the globin for purposes of fodder and foodstuffs as well as the use of the Iron components for purposes of foodstuffs and pharmaceuticals are permitted. A hemoglobin solution, prepared in the way described above or in another way, is mixed with ethanol and water and acidified to a pH lower than 4.5. Hereby the ferroprotoporphyrin is cleaved from hemoglobin in the form of different iron compounds with black colour. The chloride with the iron in the ferri form, so-called hemin, probably constitutes the main part of the formed iron compounds. It is also conceivable that polymerization, adsorption on, and reactions with, blood substances, primarily protein, take place.

When the content of iron compounds is sufficiently high and the content of ethanol in the solution is higher than 40 percent by volume, the iron compounds form agglomerates that can be separated from the liquid mixture. The protein, mainly globin, remains in the solution in dissolved form.

When the ion strength is increased, e.g. by addition of salt, an accentuation of the agglomeration of iron compounds is obtained. At the same time, an increased precipitation of protein is obtained.

According to a particularly suitable embodiment, the liquid is first cooled, i.e. before addition of ethanol and lowering of pH, to a temperature of from 0° to −20° C. In this way, the functional properties of the protein are retained in addition to its nutrient value.

According to a particular embodiment of the method in accordance with the invention, it is possible, after the pH-value has been lowered, to raise it again, whereby a voluminous precipitation of blood substances, mainly protein, and a renewed formation of hemoglobin out of iron compound and globin are obtained. This precipitate adsorbs the finely dispersed iron compound and can be separated together with this from the solution.

The same is achieved by adding to the mixture some other adsorbing material, e.g. fragments of cell membrane from the broth of red blood cells.

A precipitate of part of the protein, mainly hemoglobin, and adsorption of iron compound hereonto is also produced by raising the ethanol content while possibly, at the same time, lowering the temperature.

According to another embodiment, minor portions of the ethanol can be substituted for by methanol, propanol, isopropanol, butanol, ethylene glycol, glycerin, ethyl acetate, or acetone, whereby the same effect is obtained.

With a lower pH, a more complete cleavage of hemoglobin and agglomeration of the iron compounds are obtained, but at the same time, the functional properties of the protein are destroyed and an increased polymerization of the iron compounds is probably produced. With higher pH values, these phenomena are reduced, whereas the precipitation of protein together with iron agglomerations is increased.

The reduction in the pH is achieved, for example, by means of inorganic acids, such as hydrochloric acid and sulphuric acid, or by means of organic acids, such as acetic acid and citric acid.

By maintaining a low temperature in the liquid, preferably lower than −5° C, it is possible to retain the functional properties to a higher extent.

The reaction mixture that is obtained under the conditions indicated in the claims is black to brownish black. When the mixture is centrifuged at $10,000 \times g$, and intensive black paste is obtained that contains the major part of the iron compounds in the mixture. The supernatant is light yellow to light brown and contains the major part of the protein in the mixture. The colour of the supernatant is an indication of the extent to which the protein and the iron compound have been separated from each other.

The agglomerates of iron compounds can be separated from the mixture by means of conventional procedures, such as centrifuging, sedimentation, cyclone process, filtering, ultrafiltering, and adsorption onto voluminous or solid material.

The protein can be recovered from the solution in a conventional way, such as by means of precipitation, adsorption onto a voluminous or solid material, evaporation of the solution, drying, and concentration of the solution by means of ultrafiltering and freezing.

Depending on the procedure that is selected for recovery of the protein out of the solution, a protein more or less contaminated with iron compounds is obtained.

The protein in the solution after the separation of the agglomerations of the iron compounds under the conditions indicated in the claims and as illustrated in the examples of processing proved suitable for many purposes of foodstuffs as regards the iron content, colour, and taste.

The invention will be illustrated below by means of some exemplifying embodiments:

EXAMPLE 1

Broth of red blood cells obtained from slaughtering blood, with sodium citrate as the anti-coagulating agent, was treated with ethanol and water so that the cell membrane was exploded. The fragments of cell membrane were centrifuged off. The hemoglobin solution obtained in this way contained 15 percent of dry substance, mainly hemoglobin, 33 percent by volume of ethanol, and the rest of water, the pH-value being 5.3 and the colour dark red.

3 grams of this hemoglobin solution were cooled down to a temperature of $-12°$ C in a bowl, and, while stirring and cooling, a solution consisting of 0.50 ml of 1 M hydrochloric acid and the 96 percent-by-volume ethanol of $-12°$ C was added hereto dropwise. After the addition, the temperature was $-12°$ C and the pH-value 3.1. The content of ethanol in the mixture amounted to 78 percent by volume.

The pH was measured by diluting samples of the mixture with 3 times the sample volume of water before the measurement.

The mixture, which had a brownish black colour, was centrifuged at $27,000 \times g$ for 10 minutes in a Sorval centrifuge at $-12°$ C. Hereby a black paste weighing 1.5 g and having a dry-substance content of 2.9 percent as well as a light brown supernatant were obtained. From the supernatant, a light grey precipitate was precipitated by adding water up to 50 percent and by adjusting the pH to 7.5. The temperature was maintained at $-7°$ C. The precipitate was centrifuged off and 0.95 g of a grey paste with a dry-substance content of 28 percent were obtained.

After an analysis it was noticed that the grey paste consisted of a protein with an iron content equalling about 5 percent of the iron content in hemoglobin. The black paste evidently contains the major part of the iron compounds derived from hemoglobin. The iron compounds are probably for the major part present in the form of hemin.

EXAMPLE 2

3 grams of a hemoglobin solution (with data as given in Example 1) at a temperature of $-7°$ C were, during stirring and cooling, added dropwise into a bowl containing a solution of 0.45 ml of 1 M hydrochloric acid, 7.5 ml of water, and 10 ml of 96 percent-by-volume ethanol at $-7°$ C. After the addition, the temperature was $-6°$ C and the pH-value 3.3. The ethanol content in the mixture amounted to 50 percent by volume.

The mixture, whose colour was brownish black, was centrifuged at $10,000 \times g$ for 10 minutes, whereby a black paste was obtained containing 0.03 g of dry substance, as well as a light brown supernatant.

The supernatant was divided into two equal portions. From one of them, at pH 7.5, a grey precipitate was precipitated, which, after centrifuging and drying, yielded 0.12 g of dry substance.

The other portion was mixed with 5 ml of ethanol and 0.2 ml of 10-percent sodium chloride in a water solution while stirring and cooling as well as ultrafiltered at $-6°$ C in an Amicon Diaflo cell with a membrane XM 300. The filtrate was light yellow, the membrane was coated with a dark film. After dilution with water up to 50 percent water content and at pH 7.5, from the filtrate was precipitated a white to light grey precipitate that, after centrifuging-off and drying, yielded 0.11 g of dry substance.

EXAMPLE 3

3 grams of a hemoglobin solution (with data as given in Example 1) at $-4°$ C were, while stirring and cooling, added dropwise into a bowl containing a solution of 0.45 ml of glacial acetic acid, 0.8 ml of water, and 5 ml of 96 percent-by-volume ethanol at $-4°$ C. After the addition, the temperature was $-4°$ C and the pH-value 3.8. The ethanol content in the mixture was 62 percent by volume.

The brownish black mixture was centrifuged at $27,000 \times g$ for 10 minutes, whereupon a black paste with a dry-substance quantity of 0.11 g as well as a light brown supernatant were obtained.

From the supernatant, after dilution with water to a water content of 50 percent and at pH 7.5, a light brown to grey precipitate was precipitated, which, after centrifuging-off and drying, yielded 0.25 g of dry substance.

EXAMPLE 4

3 grams of a hemoglobin solution (with data as given in Example 1) at $-8°$ C were, while stirring and cooling, added dropwise into a bowl containing a solution of 0.45 ml of 1 M hydrochloric acid, 0.2 ml of 20-percent sodium chloride in a water solution, and 10 ml of 96 percent-by-volume ethanol at $-15°$ C. After the addition, the temperature was $-10°$ C and the pH-value 3.3. The ethanol content in the solution was 77 percent by volume.

The mixture, which had a brownish black colour, was centrifuged at $10,000 \times g$ for 10 minutes, whereby a black paste containing 0.09 g of dry substance as well as a light yellow to light brown supernatant were obtained.

From the supernatant, after dilution with water to a water content of 50 percent and at pH 7.5, a grey precipitate was precipitated, which, after centrifuging-off and drying, yielded 0.30 g of dry substance.

EXAMPLE 5

6 ml of 96 percent-by-volume ethanol were added dropwise, while stirring and cooling, into a bowl containing 3 g of a hemoglobin solution (with data as given in Example 1). The temperature was −10° C. Into this hemoglobin suspension were, while stirring and cooling, added dropwise 0.4 ml of 1 M hydrochloric acid in 3 ml of 96 percent-by-volume ethanol. After the addition, the temperature was −10° C and the pH-value 3.4. The ethanol content in the mixture was 77 percent by volume.

The brownish black mixture was centrifuged at 20,000 × g for 10 minutes, whereby a black paste containing 0.08 g of dry substance as well as a light brown supernatant were obtained.

0.19 ml of 0.5 M sodium hydroxide in 10 ml of 96 percent-by-volume ethanol were added dropwise, while cooling and stirring, to the supernatant. After the addition, the temperature was −10° C and the pH-value 4.35. The ethanol content in the mixture was 85 percent by volume.

The precipitate formed, a fraction of blood protein with adsorbed iron compounds, was centrifuged off and yielded a black and red paste with a dry-substance quantity of 0.08 g.

Out of the extremely palely yellow-coloured supernatant, after addition of water to a water content of 50 percent and after raising of the pH to 7.5, while cooling, a light grey precipitate was precipitated, which yielded 0.22 g of dry substance, after centrifuging and drying.

EXAMPLE 6

3 g of a hemoglobin solution (with data as given in Example 1) at a temperature of −8° C were added dropwise, while stirring and cooling, to a bowl containing a solution of 0.45 ml of 1 M hydrochloric acid and 10 ml of 96 percent-by-volume ethanol at a temperature of −8° C. After the addition, the temperature was −8° C and the pH-value 3.3. The ethanol content in the mixture was 78 percent by volume.

The brownish black mixture was centrifuged at 10,000 × g for 10 minutes, whereby a black paste with a dry-substance quantity of 0.06 g and a light brown supernatant were obtained.

1 ml of a suspension consisting of 0.1 g of broth of red blood cells in equal portions of ethanol and water at a temperature of −8° C and at pH 5.3 was added dropwise, while stirring and cooling, to the supernatant. After the addition, the temperature was −8° C and the ethanol content was 75 percent by volume.

The mixture was centrifuged at 10,000 × g for 10 minutes, whereby a minor quantity of black paste and a light brown to light yellow supernatant were obtained. In the same way as described in Example 5, from the supernatant a light grey precipitate was precipitated, which yielded 0.25 g of dry substance, after centrifuging and drying.

EXAMPLE 7

3 g of a hemoglobin solution (with data as given in Example 1) at a temperature of −6° C were added dropwise, while stirring and cooling, into a bowl containing a solution of 0.50 ml of 1 M hydrochloric acid, 8 ml of 96 percent-by-volume ethanol, and 2 ml of glycerin at a temperature of −8° C. After the addition, the temperature was −8° C and the pH-value 3.1. The total quantity of ethanol and glycerin in the mixture amounted to 82 percent by volume.

The brownish black mixture was centrifuged at 27,000 × g for 10 minutes, whereby a black paste with a dry-substance quantity of 0.09 g as well as a light brown to light yellow supernatant were obtained.

In the same way as in Example 5, from the supernatant, a light grey precipitate was precipitated, which yielded 0.26 g of dry substance, after centrifuging and drying.

In the same way, experiments were made by adding the same quantity of ethylene glycol, propanol, isopropanol, methanol, aceton, and ethylacetate as that of glycerin. The result was the same as above.

EXAMPLE 8

To a solution of 20 ml of 96 percent-by-volume ethanol and 1.1 ml of 1 M hydrochloric acid at a temperature of −12° C were added dropwise, while stirring and cooling, 5 g of a hemoglobin solution (with the same data as given in Example 1). After the addition, the pH-value was 2.9 and the temperature −12° C. The ethanol content in the mixture was 80 percent by volume. The mixture, which was of a brownish black colour, was centrifuged at 27,000 × g for 10 minutes, whereby 2.2 g of a black paste with a dry-substance content of 2.7 percent as well as a light brown supernatant, which later assumed a gel-type consistency, were obtained.

To the supernatant were added dropwise, while stirring and cooling, 70 ml of 96 percent-by-volume cold ethanol and then 0.8 ml of 40-percent ammoniumsulphate solution (water solution) and 8 ml of water. The temperature after the addition was −6° C. The precipitate was centrifuged off at 8,000 × g for 10 minutes, whereby 1.7 g of a white paste with a dry-substance content of 36 percent were obtained.

EXAMPLE 9

3 g of a hemoglobin solution (with data as given in Example 1) at a temperature of +8° C were added dropwise, while stirring, into a bowl containing a solution of 0.80 ml of 1 M hydrochloric acid, 2 ml of water, and 10 ml of 96 percent-by-volume ethanol at a temperature of +2° C. After the addition, the temperature was +8° C and the pH-value 2.5. The ethanol content in the mixture amounted to 67 percent by volume.

The brownish black mixture was centrifuged at 27,000 × g for 10 minutes at +8° C, whereby a black paste with 0.06 g of dry substance and a yellow supernatant were obtained.

From the supernatant was precipitated in the same way as described in Example 5, a light grey precipitate that yielded 0.27 g of dry substance, after centrifuging and drying.

EXAMPLE 10

3 g of a hemoglobin solution (with data as given in Example 1) at a temperature of −12° C were added dropwise, while stirring and cooling, into a bowl containing a solution of 0.35 ml of 2 M hydrochloric acid and 5 ml of absolute ethanol at a temperature of −12° C. After the addition, the temperature was −12° C and the pH-value 2.9. The ethanol content in the mixture amounted to 71 percent by volume. The brownish black mixture was centrifuged at 27,000 × g for 10 minutes at −12° C, whereby a black paste with a dry-substance quantity of 0.07 g as well as a light yellow supernatant were obtained.

15 ml of 96 percent-by-volume ethanol at a temperature of −18° C were added dropwise, while stirring and cooling, to the supernatant. After the addition, the temperature was −18° C. The ethanol content in the mixture amounted to 86 percent by volume.

After 10 hours at −18° C, the mixture was centrifuged as described above, whereby a black and red paste was obtained with a dry-substance quantity of 0.08 g.

The extremely vaguely light yellow-coloured supernatant was divided into two equal portions.

From one of the portions, in the same way as in Example 5, a light grey to white precipitate was precipitated, which yielded 0.11 g of dry substance, after centrifuging and drying.

The other portion was ultrafiltered in an Amicon Diaflo cell with a membrane PM 10 at −8° C. The concentrate was mixed with 10 ml of water at 0° C and filtered. The protein solution in this way de-ethanolized was neutralized and dried, and it yielded 0.06 g of dry substance.

The invention is not restricted to the exemplifying embodiments described above, but it can be varied within the scope of the idea of the invention.

What I claim is:

1. A method for separating iron compounds from the protein in a hemoglobin solution comprising adding to said solution an organic solvent comprising ethanol in an amount such that the total ethanol content in the solution is at least 40% by volume, adjusting the pH of the solution to a value less than about 4.5 whereby iron compounds in the solution are agglomerated, and thereafter separating the agglomerated iron compounds from the solution.

2. The method of claim 1 wherein the pH of said solution is adjusted to a value of from about 2.5–4.5.

3. The method of claim 1 wherein the amount of ethanol added to said solution is at least about 70% by volume of said solution.

4. The method of claim 1 further comprising the step of separating the protein in the solution subsequent to separation of iron compounds therefrom.

5. The method of claim 4 wherein said agglomerated iron compounds are separated from said solution by a technique selected from the group comprising centrifugation, cyclone process, filtering, ultrafiltering, sedimenting and adsorption.

6. The method of claim 1 further comprising the steps of cooling said solution to a temperature of from about 0° C. to −20° C. prior to the addition thereto of said organic solvent comprising ethanol, and maintaining said solution at such temperature during further treatment.

7. The method of claim 1 further comprising the steps of raising the pH of the solution subsequent to the agglomeration of iron compounds whereby a precipitate is obtained which comprises protein and unagglomerated iron compounds, and separating said precipitate from said solution.

8. The method of claim 7 wherein the pH of the solution is raised and the precipitate formed thereby is separated from the solution subsequent to the separation of the agglomerated iron compounds from said solution.

9. The method of claim 1 further comprising the steps of adding an amount of waste blood to the solution subsequent to agglomeration of iron compounds whereby a precipitate is obtained which comprises protein and unagglomerated iron compounds, and separating said precipitate from said solution.

10. The method of claim 9 wherein said waste blood is added to the solution and the precipitate formed thereby is separated from the solution subsequent to the separation of the agglomerated iron compounds from said solution.

11. The method of claim 1 further comprising the steps of adding additional ethanol to the solution subsequent to the agglomeration of iron compounds whereby a precipitate is obtained which comprises protein and unagglomerated compounds, and separating said precipitate from said solution.

12. The method of claim 11 wherein said additional ethanol is added and the precipitate formed thereby is separated from the solution subsequent to the separation of the agglomerated iron compounds from said solution.

13. The method of claim 11 wherein said additional ethanol is added to said solution while simultaneously lowering the temperature of said solution.

14. The method of claim 1 wherein said organic solvent comprises a mixture of ethanol and a compound selected from the group consisting of glycerin, ethylene glycol, methanol, acetone, ethylacetate, propanol, isopropanol, and butanol.

15. The method of claim 4 wherein said protein is separated by precipitation and centrifugation resulting in the formation of a supernatant and further protein is separated from said supernatant.

16. The method of claim 1 wherein the agglomeration of iron compounds is accelerated by the addition of an inorganic salt to said solution, said inorganic salt being selected from the group comprising sodium and potassium salts.

17. The method of claim 16 wherein said salt is sodium chloride.